US007827385B2

(12) United States Patent
Almasi et al.

(10) Patent No.: US 7,827,385 B2
(45) Date of Patent: Nov. 2, 2010

(54) EFFECTING A BROADCAST WITH AN ALLREDUCE OPERATION ON A PARALLEL COMPUTER

(75) Inventors: Gheorghe Almasi, Ardsley, NY (US); Charles J. Archer, Rochester, MN (US); Joseph D. Ratterman, Rochester, MN (US); Brian E. Smith, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 481 days.

(21) Appl. No.: 11/832,918

(22) Filed: Aug. 2, 2007

(65) Prior Publication Data

US 2009/0037511 A1    Feb. 5, 2009

(51) Int. Cl.
  *G06F 15/76*    (2006.01)
(52) U.S. Cl. .................................... 712/16; 712/17
(58) Field of Classification Search .................. 712/16, 712/17
See application file for complete search history.

(56) References Cited

U.S. PATENT DOCUMENTS

| 4,715,032 | A | 12/1987 | Nilsson |
| 5,105,424 | A | 4/1992 | Flaig et al. |
| 5,333,279 | A | 7/1994 | Dunning |
| 5,513,371 | A | 4/1996 | Cypher et al. |
| 5,541,914 | A | 7/1996 | Krishnamoorthy et al. |
| 5,617,538 | A | 4/1997 | Heller |
| 5,721,828 | A | 2/1998 | Frisch |
| 5,822,604 | A | 10/1998 | Ogasawara et al. |
| 5,832,215 | A | 11/1998 | Kato et al. |
| 5,864,712 | A | 1/1999 | Carmichael et al. |
| 5,878,241 | A | 3/1999 | Wilkinson et al. |
| 5,892,923 | A | 4/1999 | Yasuda et al. |
| 5,937,202 | A | 8/1999 | Crosetto et al. |
| 5,949,988 | A | 9/1999 | Feisullin et al. |
| 5,958,017 | A | 9/1999 | Scott et al. |
| 6,000,024 | A | 12/1999 | Maddox et al. |
| 6,067,609 | A | 5/2000 | Meeker et al. |

(Continued)

FOREIGN PATENT DOCUMENTS

EP    1835414 A2    9/2007

OTHER PUBLICATIONS

Sunggu Lee; Shin, K.G., "Interleaved all-to-all reliable broadcast on meshes and hypercubes," Parallel and Distributed Systems, IEEE Transactions on, vol. 5, pp. 449-458, May 1994.

(Continued)

*Primary Examiner*—Jacob Petranek
(74) *Attorney, Agent, or Firm*—Biggers & Ohanian, LLP

(57) ABSTRACT

A parallel computer comprises a plurality of compute nodes organized into at least one operational group for collective parallel operations. Each compute node is assigned a unique rank and is coupled for data communications through a global combining network. One compute node is assigned to be a logical root. A send buffer and a receive buffer is configured. Each element of a contribution of the logical root in the send buffer is contributed. One or more zeros corresponding to a size of the element are injected. An allreduce operation with a bitwise OR using the element and the injected zeros is performed. And the result for the allreduce operation is determined and stored in each receive buffer.

18 Claims, 7 Drawing Sheets

U.S. PATENT DOCUMENTS

| | | | |
|---|---|---|---|
| 6,076,131 | A | 6/2000 | Nugent |
| 6,212,617 | B1 | 4/2001 | Hardwick |
| 6,272,548 | B1 | 8/2001 | Cotter et al. |
| 6,289,424 | B1 | 9/2001 | Stevens |
| 6,292,822 | B1 | 9/2001 | Hardwick |
| 6,334,138 | B1 | 12/2001 | Kureya |
| 6,480,885 | B1 | 11/2002 | Olivier |
| 6,754,211 | B1 | 6/2004 | Brown |
| 6,914,606 | B2 | 7/2005 | Amemiya et al. |
| 7,284,033 | B2 | 10/2007 | Jhani |
| 7,444,385 | B2 * | 10/2008 | Blumrich et al. ............ 709/217 |
| 2002/0016901 | A1 | 2/2002 | Carvey et al. |
| 2002/0144027 | A1 | 10/2002 | Schmisseur |
| 2004/0034678 | A1 | 2/2004 | Kuszmaul et al. |
| 2004/0073590 | A1 | 4/2004 | Bhanot et al. |
| 2005/0094577 | A1 | 5/2005 | Ashwood-Smith |
| 2007/0245122 | A1 * | 10/2007 | Archer et al. ................. 712/17 |
| 2008/0263329 | A1 * | 10/2008 | Archer et al. ............... 712/213 |
| 2008/0301683 | A1 * | 12/2008 | Archer et al. ............... 718/102 |

OTHER PUBLICATIONS

Wikipedia. "Depth-First Search" May 5, 2007. http://web.archive.org/web/20070505212029/http://en.wikipedia.org/wiki/Depth-first_Search.

Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

U.S. Appl. No. 60/271,124, filed Feb. 24, 2001, pp. 12-13, 27 and 42-43.

Office Action Dated Mar. 4, 2008 in U.S. Appl. No. 11/279,620.

Office Action Dated Sep. 3, 2008 in U.S. Appl. No. 11/279,620.

Office Action Dated Dec. 29, 2008 in U.S. Appl. No. 11/279,620.

Office Action Dated Apr. 3, 2009 in U.S. Appl. No. 11/769,367.

Office Action Dated Dec. 13, 2007 in U.S. Appl. No. 11/459,387.

Office Action Dated Jul. 11, 2008 in U.S. Appl. No. 11/459,387.

Office Action Dated Mar. 18, 2009 in U.S. Appl. No. 11/459,387.

Office Action Dated Feb. 9, 2009 in U.S. Appl. No. 11/737,286.

Sistare, et al.; Optimization of MPI collectives on clusters of large-scale SMP's, Conference on High Performance Networking and Computing, Proceedings of the 1999 ACM/IEEE conference on Supercomputing; 1999.

Tanenbaum, Structured Computer Organization, Second Edition, Prentice-Hall, Inc., 1984.

Rosenberg; Dictionarty of Computers, Information Processing & Telecommunications, Second Edition, John Wiley & Sons, 1987.

Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.

Fisher, et al.; "Computing the Hough Transform on a Scar Line Array Processor"; IEEE Transactions on Pattern Analysis and Machine Intelligence; vol. II, No. 3; Mar. 1989; pp. 262-265.

Office Action Dated Jul. 20, 2009 in U.S. Appl. No. 11/737,209.

Office Action Dated Sep. 4, 2009 in U.S. Appl. No. 11/843,090.

* cited by examiner

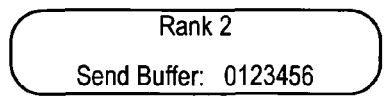
FIG. 7A: Send Buffer Status For
Logical Root Before Gather
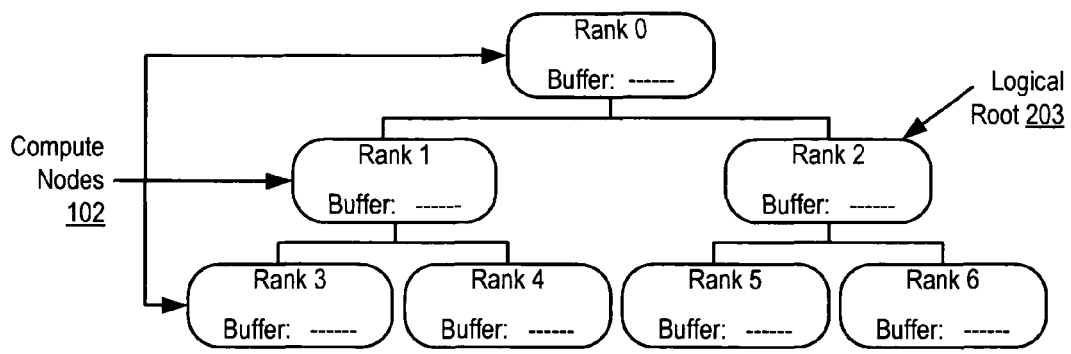
FIG. 7B: Beginning Receive Buffer
Status For Each Compute Node
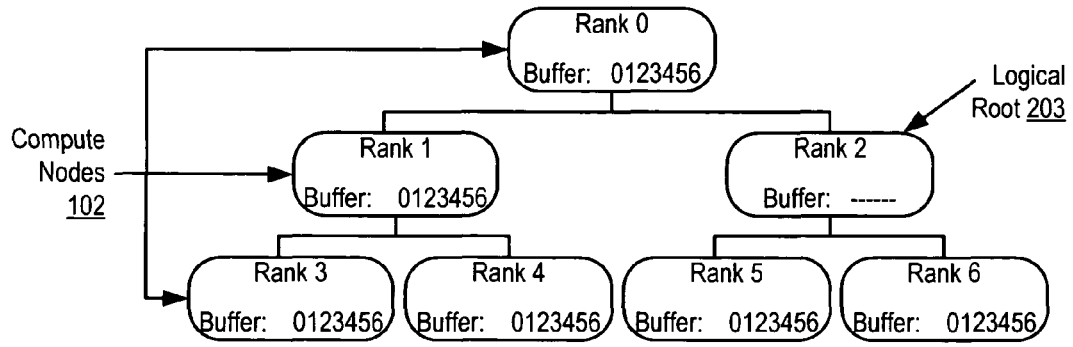
FIG. 7C: Receive Buffer Status For
Each Compute Node After Broadcast
Using Allreduce For Each Element

US 7,827,385 B2

EFFECTING A BROADCAST WITH AN ALLREDUCE OPERATION ON A PARALLEL COMPUTER

STATEMENT REGARDING FEDERALLY SPONSORED RESEARCH OR DEVELOPMENT

This invention was made with Government support under Contract No. B519700 awarded by the Department of Energy. The Government has certain rights in this invention.

BACKGROUND OF THE INVENTION

1. Field of the Invention

The field of the invention is data processing, or, more specifically, methods, apparatus, and products for effecting a broadcast with an allreduce operation on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an broadcast. Because thousands of nodes may participate in collective operations on a parallel computer, executing an broadcast operation on a parallel computer is always a challenge.

SUMMARY OF THE INVENTION

Methods, parallel computers, and computer program products are disclosed for effecting a broadcast with an allreduce operation on a parallel computer, the parallel computer comprising a plurality of compute nodes, the compute nodes organized into at least one operational group of compute nodes for collective parallel operations of the parallel computer, each compute node in the operational group assigned a unique rank, the compute nodes of the operational group coupled for data communications through a global combining network; and one compute node assigned to be a logical root. Embodiments include configuring, by the logical root node, a send buffer having a contribution to be broadcast to each ranked node in the operational group; configuring, by all ranked nodes other than the logical root, a receive buffer for receiving the contribution from the logical root; and repeatedly for each element of the contribution of the logical root in the send buffer: contributing, by the logical root, the element of the contribution in the send buffer; injecting, by all ranked nodes other than the logical root, one or more zeros corresponding to a size of the element; performing, by all the compute nodes of the operational group, an allreduce operation with a bitwise OR using the element and the injected zeros, yielding a result for the allreduce operation; and storing in each receive buffer, by all ranked nodes other than the logical root, the result of the allreduce.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIGS. 7A, 7B, and 7C set forth block diagrams of some buffers of the same operational group of compute nodes (102) illustrated at reference (132) on FIG. 6.

DETAILED DESCRIPTION OF EXEMPLARY EMBODIMENTS

Figure 1:
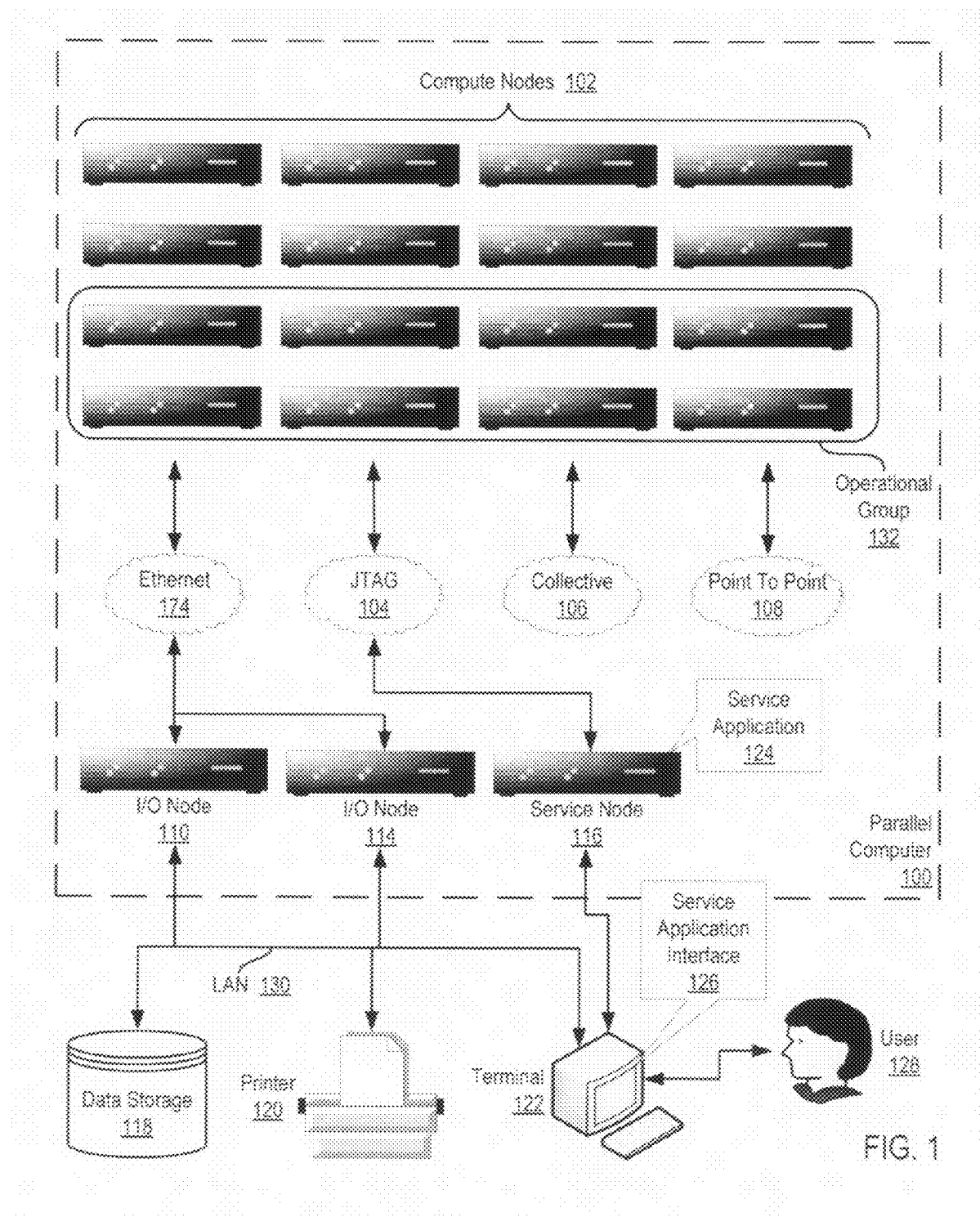
FIG. 1 illustrates an exemplary system for effecting a broadcast with an allreduce operation on a parallel computer according to embodiments of the present invention.

Exemplary methods, apparatus, and computer program products for effecting a broadcast with an allreduce operation on a parallel computer according to embodiments of the present invention are described with reference to the accompanying drawings, beginning with FIG. 1. FIG. 1 illustrates an exemplary system for effecting a broadcast with an allreduce operation on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for effecting a broadcast with an allreduce operation on a parallel computer according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

As described in more detail below in this specification, the system of FIG. 1 operates generally to effecting a broadcast with an allreduce operation on a parallel computer according to embodiments of the present invention by configuring, by the logical root node, a send buffer having a contribution to be broadcast to each ranked node in the operational group; configuring, by all ranked nodes other than the logical root, a receive buffer for receiving the contribution from the logical root; and repeatedly for each element of the contribution of the logical root in the send buffer: contributing, by the logical root, the element of the contribution in the send buffer; injecting, by all ranked nodes other than the logical root, one or more zeros corresponding to a size of the element; performing, by all the compute nodes of the operational group, an allreduce operation with a bitwise OR using the element and the injected zeros, yielding a result for the allreduce operation; and storing in each receive buffer, by all ranked nodes other than the logical root, the result of the allreduce.

A 'bitwise OR function,' as the term is used in this specification, is an inclusive bitwise OR rather than an exclusive bitwise OR. The symbol for the inclusive bitwise OR function in the C and C++ programming languages is '|'. The inclusive bitwise OR function conducts a logical OR function separately on each bit of its operands. The effect is to turn bits on. For these operands, for example, x=00000000 00000001 00000000, in decimal, x=010, and
y=00000000 00000000 00000010, in decimal, y=002, x=x|y yields x=00000000 00000001 00000010, in decimal, x=012. That is, all the bits that were on in each operand are also on in the result of the bitwise OR function.

An allreduce operation with a bitwise OR function is a collective operation on an operational group of compute nodes that combines, through the bitwise OR function, contributions of data from all compute nodes in the operational group and transmits the combined contributions to all compute nodes in the operational group. The functions of an allreduce operation are defined in the MPI standards promulgated by the MPI Forum. Algorithms for executing collective operations, including the functions of an allreduce operation, are not defined in the MPI standards.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount *N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The arrangement of nodes, networks, and I/O devices making up the exemplary system illustrated in FIG. 1 are for explanation only, not for limitation of the present invention. Data processing systems capable of effecting a broadcast with an allreduce operation on a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of effecting a broadcast with an allreduce operation on a parallel computer according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Effecting a broadcast with an allreduce operation on a parallel computer according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of effecting a broadcast with an allreduce operation on a parallel computer according to embodiments of the present invention. The compute node (152) of FIG. 2 includes at least one computer processor (164) as well as random access memory ('RAM') (156). Processor (164) is connected to RAM (156) through a high-speed memory bus (154) and through a bus adapter (194) and a extension bus (168) to other components of the compute node. Stored in RAM (156) is an application program (158), a module of computer program instructions that carries out parallel, user-level data processing using parallel algorithms.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in effecting a broadcast with an allreduce operation on a parallel computer according to embodiments of the present invention, using a traditional programming language such as the C programming language, and using traditional programming methods to write parallel communications routines that send and receive data among nodes on two independent data communications networks. Alternatively, existing prior art libraries may be used. Examples of prior-art parallel communications libraries that may be improved for effecting a broadcast with an allreduce operation on a parallel computer according to embodiments of the present invention include the 'Message Passing Interface' ('MPI') library and the 'Parallel Virtual Machine' ('PVM') library. However it is developed, the parallel communications routines of parallel communication library (160) are improved to effect a broadcast with an allreduce operation on a parallel computer according to embodiments of the present invention by configuring, by the logical root node, a send buffer having a contribution to be broadcast to each ranked node in the operational group; configuring, by all ranked nodes other than the logical root, a receive buffer for receiving the contribution from the logical root; and repeatedly for each element of the contribution of the logical root in the send buffer: contributing, by the logical root, the element of the contribution in the send buffer; injecting, by all ranked nodes other than the logical root, one or more zeros corresponding to a size of the element; performing, by all the compute nodes of the operational group, an allreduce operation with a bitwise OR using the element and the injected zeros, yielding a result for the allreduce operation; and storing in each receive buffer, by all ranked nodes other than the logical root, the result of the allreduce.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
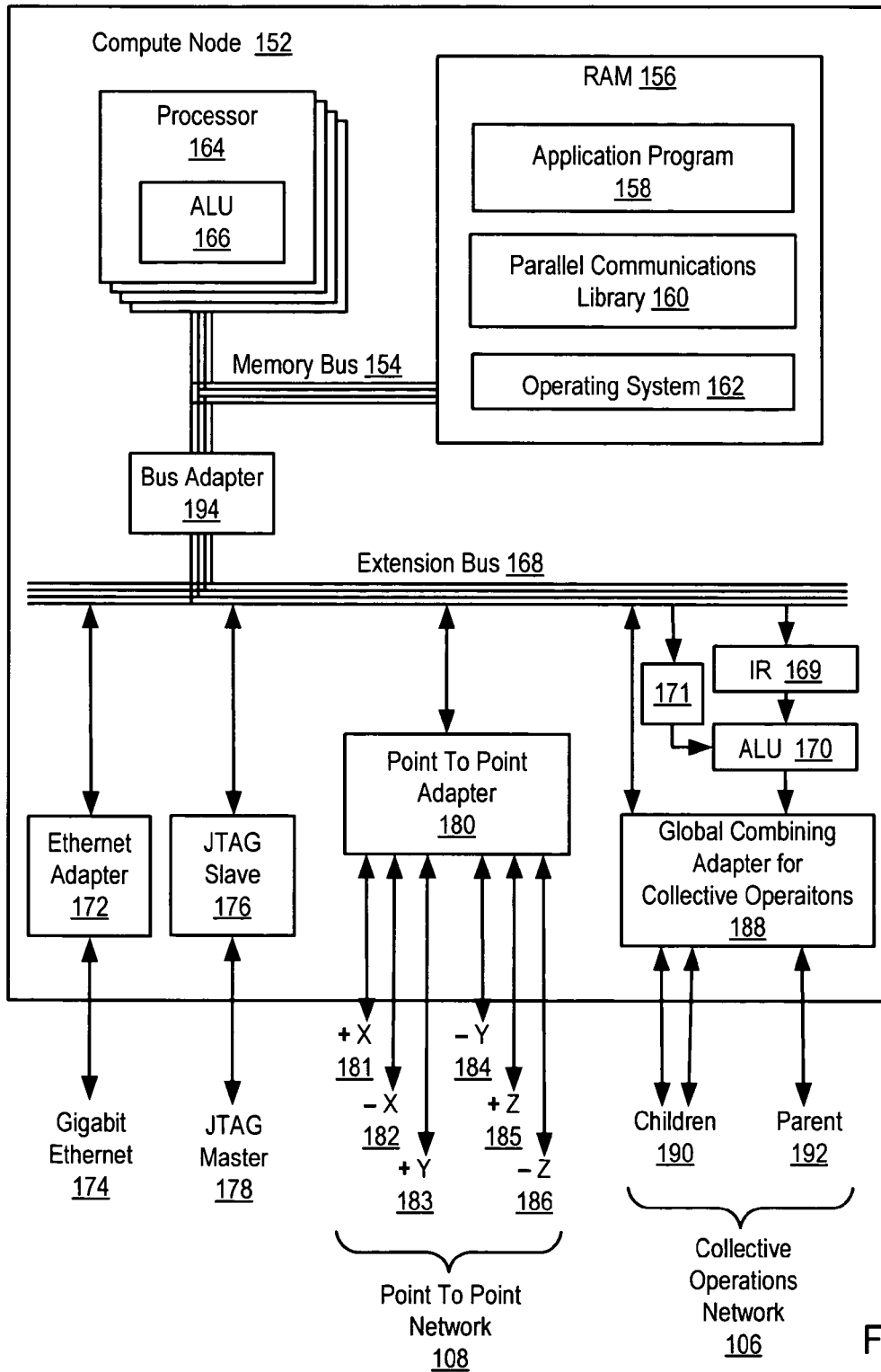
FIG. 2 sets forth a block diagram of an exemplary compute node useful in a parallel computer capable of effecting a broadcast with an allreduce operation on a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that effect a broadcast with an allreduce operation on a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in effecting a broadcast with an allreduce operation on a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a global combining Network Adapter (188) that couples example compute node (152) for data communications to a network (106) that is optimal for collective message passing operations such as, for example, a network configured as a binary tree. Global combining network adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of global combining network adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, global combining network adapter (188) may execute the arithmetic or logical operation by use of ALU (166) in processor (164) or, typically much faster, by use dedicated ALU (170).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processors (162) on the compute node (152) contribute data that alters the output of ALU (170) that is passed up or down the global combining network (106). Because the ALU (170) typically does not output any data onto the network (106) until the ALU (170) receives input from a processor (164), a processor (164) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (152) includes dedicated hardware (171) for injecting identity elements into the ALU (170) to reduce the amount of processor resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
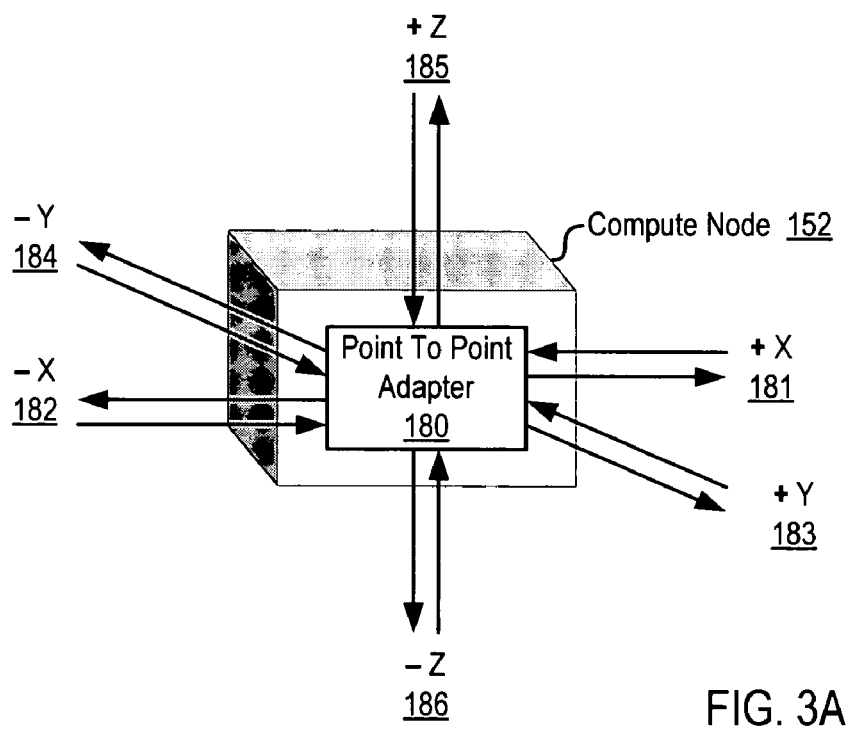
FIG. 3A illustrates an exemplary Point To Point Adapter useful in systems that effecting a broadcast with an allreduce operation on a parallel computer according to embodiments of the present invention.

For further explanation, FIG. 3A illustrates an exemplary Point To Point Adapter (180) useful in systems that effecting a broadcast with an allreduce operation on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
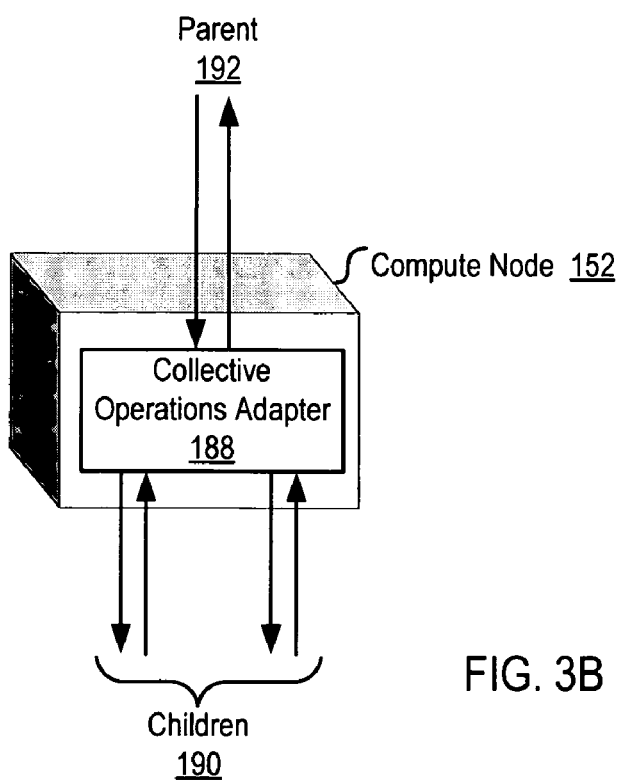
FIG. 3B illustrates an exemplary global combining network adapter useful in systems that effect a broadcast with an allreduce operation on a parallel computer according to embodiments of the present invention.

For further explanation, FIG. 3B illustrates an exemplary global combining network adapter (188) useful in systems that effect a broadcast with an allreduce operation on a parallel computer according to embodiments of the present invention. Global combining network adapter (188) is designed for use in a network optimized for collective operations, a network that organizes compute nodes of a parallel computer in a binary tree. Global combining network adapter (188) in the example of FIG. 3B provides data communication to and from two children nodes through four unidirectional data communications links (190). Global combining network adapter (188) also provides data communication to and from a parent node through two unidirectional data communications links (192).

Figure 4:
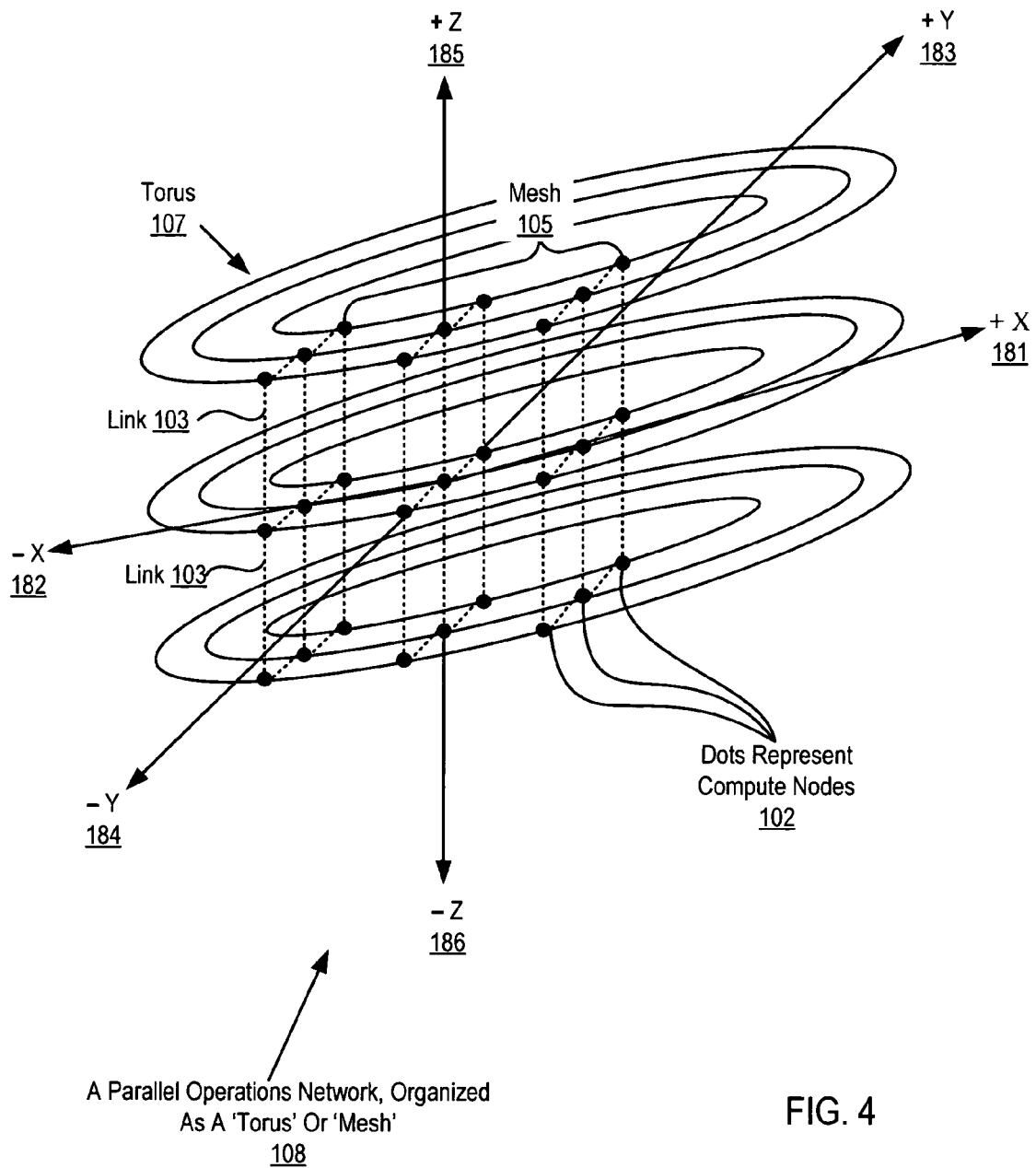
FIG. 4 illustrates an exemplary data communications network optimized for point to point operations.

For further explanation, FIG. 4 illustrates an exemplary data communications network optimized for point to point operations (106). In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations for use in effecting a broadcast with an allreduce operation on a parallel computer on accordance with embodiments of the present invention may contain only a few compute nodes or may contain thousands of compute nodes.

Figure 5:
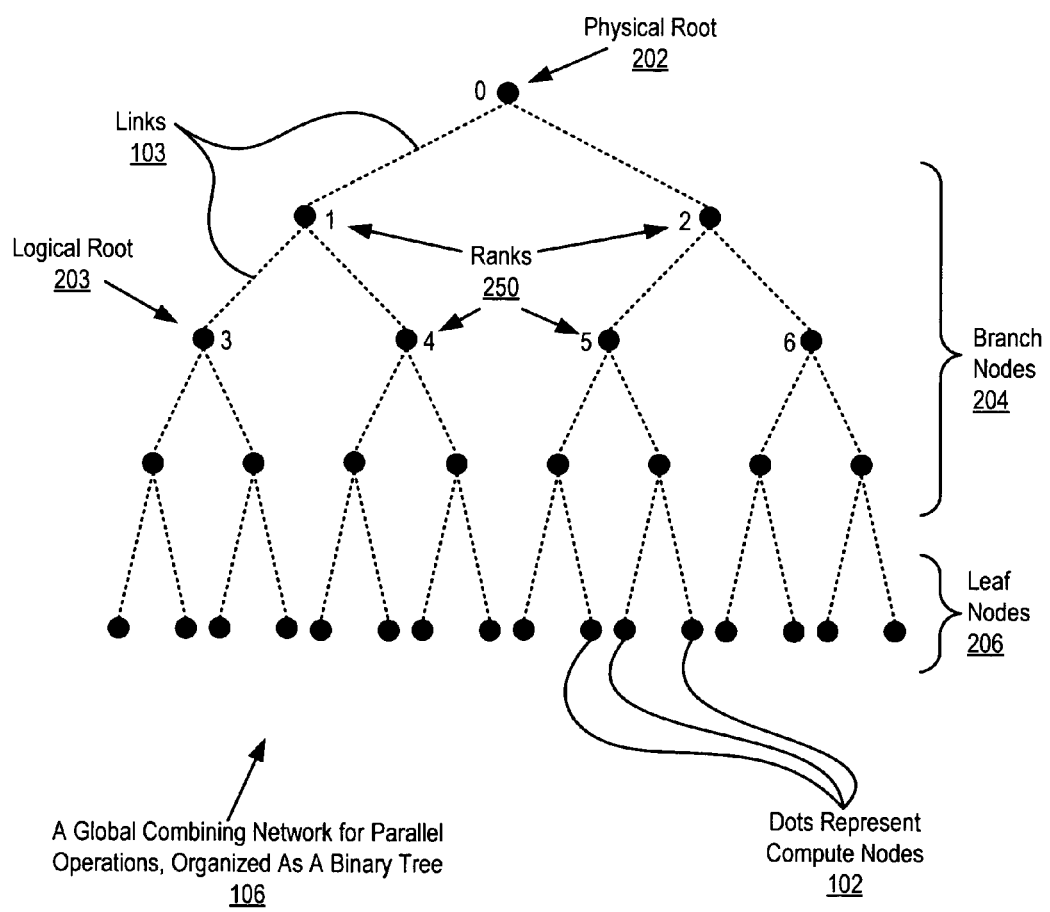
FIG. 5 illustrates an exemplary data communications network optimized for collective operations by organizing compute nodes in a tree.

For further explanation, FIG. 5 illustrates an exemplary data communications network (106) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in effecting a broadcast with an allreduce operation on a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In the example of FIG. 5, the physical root node (202) is not to be confused with the logical root node (203). While the logical root node (203) executes the originating or receiving process in a particular collective operation, the physical root node (202) is the node physically configured at the top of the binary tree that effects data communications to all the nodes (102) in the binary tree. Consider, for example, that the nodes (102) effect a broadcast with an allreduce operation according to embodiments of the present invention. The logical root configures a send buffer having a contribution to be broadcast to each ranked node in the operational group and all ranked nodes in the operational group other than the logical root configure a receive buffer for receiving the contribution from the logical root. A broadcast according to embodiments of the present invention may be effected by repeatedly for each element of the contribution of the logical root in the send buffer: contributing, by the logical root, the element of the contribution in the send buffer; injecting, by all ranked nodes other than the logical root, one or more zeros corresponding to a size of the element; performing, by all the compute nodes of the operational group, an allreduce operation with a bitwise OR using the element and the injected zeros, yielding a result for the allreduce operation; and storing in each receive buffer, by all ranked nodes other than the logical root, the result of the allreduce. A bitwise OR operation is performed on each element of the contribution data to be broadcast from the logical root in the global combining network adapter in each compute node and the result is passed up to the physical root (202). Because for each element in the send buffer of the logical root, each compute node combines the data from the compute node itself (either contribution data or zeros) and the child nodes below the compute node using a bitwise OR operation, the result of the bitwise OR operation is reaches the physical root (202) of the combining tree and upon the results reaching the physical root node (202), the physical root (202) sends the results back down the tree to each compute node and the results for that element are stored in the receive buffer by the each of the compute nodes of the operational group with the exception of possibly the logical root who already has the result in its send buffer.

Figure 6:
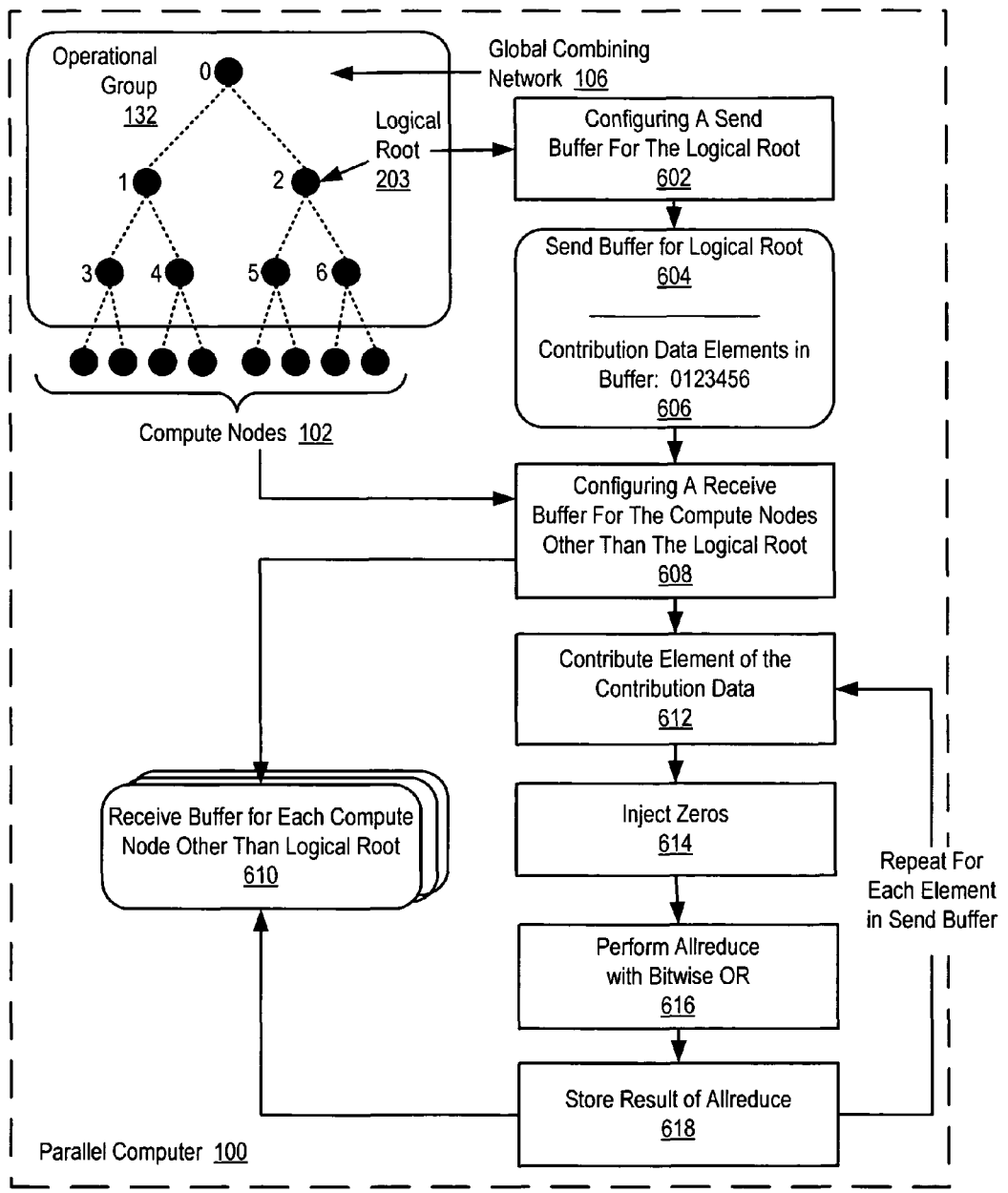
FIG. 6 sets forth a flow chart illustrating an exemplary method for effecting a broadcast with an allreduce operation on a parallel computer according to embodiments of the present invention.

For further explanation, FIG. 6 sets forth a flow chart illustrating an exemplary method for effecting a broadcast with an allreduce operation on a parallel computer (100) according to embodiments of the present invention. The parallel computer includes a plurality of compute nodes (102), represented here by black dots in global combining network (106) organized for collective operations as a tree. The global combining network (106) is a data communications network of a parallel computer (100) that includes data communications links connected to the compute nodes so as to organize the compute nodes as a tree. In this example, the data communications links are represented by dotted lines connecting the dots that represent the compute nodes (102). In additional in this example, each compute node has a separate ALU dedicated to parallel reduce operations. The separate, dedicated ALUs are not shown in FIG. 6, but they are of the kind illustrated and described above regarding reference (170) on FIG. 2.

In addition to their organization as a tree, the compute nodes (102) of parallel computer (100) are organized into an operational group (132) of compute nodes for collective parallel operations on parallel computer (100), and each compute node in the operational group is assigned a unique rank. The ranks are shown here as integers immediately left adjacent to each computer node in operational group (132). The ranks in this example are assigned as a sequence of integers beginning with 0 assigned to the root node, 1 assigned to the first node in the second layer of the tree, 2 assigned to the second node in the second layer of the tree which in the example of FIG. 6 is the logical root (203), 3 assigned to the first node in the third layer of the tree, and so on.

In the example of FIG. 6, the second node in the second layer of the tree is the logical root (203). Effecting a broadcast with an allreduce operation on a parallel computer (100) according to embodiments of the present invention includes configuring (602), by the logical root node (203), a send buffer (604) having a contribution (606) to be broadcast to each ranked node (0-6) in the operational group (132) and configuring (608), by all ranked nodes (0, 1, 3, 4, 5, 6) other than the logical root (203), a receive buffer (610) for receiving the contribution (606) from the logical root (203). The send buffer of the logical root contains the contribution to be broadcast and the receive buffers of all the nodes ranked nodes (0, 1, 3, 4, 5, 6) other than the logical root (203) are for storing element by element the contribution to be broadcast from the logical root.

The contribution data is stored in each receive buffer of the ranked nodes (0, 1, 3, 4, 5, 6) other than the logical root (203) as the result of an allreduce with a bitwise OR operation on each element of the contribution data. The method of FIG. 6 therefore also includes repeatedly for each element of the contribution (606) of the logical root (203) in the send buffer (604):

contributing (612), by the logical root (203), the element of the contribution (606) in the send buffer (604);

injecting (614), by all ranked nodes (0, 1, 3, 4, 5, 6) other than the logical root (203), one or more zeros corresponding to a size of the element;

performing (616), by all the compute nodes (0-6) of the operational group (132), an allreduce operation with a bitwise OR using the element and the injected zeros, yielding a result for the allreduce operation; and storing (618) in each receive buffer (610), by all ranked nodes (0, 1, 3, 4, 5, 6) other than the logical root (203), the result of the allreduce.

Turning now to the specific steps of the method of FIG. 6, the method of FIG. 6 includes contributing (612), by the logical root (203), the element of the contribution (606) in the send buffer (604). The element of the contribution in the send buffer contributed by the logical root in the method of FIG. 6 is the next element of the sent buffer which will ultimately be stored in each of the receive buffers of the ranked nodes other than the logical root. Such an element is often a fixed size and that size may be optimized in dependence upon the specific hardware of the parallel computer upon which the method of FIG. 6 is implemented.

The method of FIG. 6 also includes injecting (614), by all ranked nodes (0, 1, 3, 4, 5, 6) other than the logical root (203), one or more zeros corresponding to a size of the element. A zero is typically injected for each bit of the element contributed by the logical root. Injecting one or more zeros corresponding to a size of the element may be carried out by injecting one or more zeros from dedicated hardware of the compute node. Such dedicated hardware may provide increased speed because the zero bits injected, that is, a injection of a zero for each bit of the element of is known and therefore there is no need to read from any buffers or memory to inject the zeros.

The method of FIG. 6 includes performing (616), by all the compute nodes (0-6) of the operational group (132), an allreduce operation with a bitwise OR using the element and the injected zeros, yielding a result for the allreduce operation; and storing (618) in each receive buffer (610), by all ranked nodes (0, 1, 3, 4, 5, 6) other than the logical root (203), the result of the allreduce. Performing, by all the compute nodes of the operational group, an allreduce operation with a bitwise OR using the element and the injected zeros may be carried out by performing the bitwise OR with an arithmetic logic unit ('ALU') on a global combining network adapter for the global combing network such as the global combining adapter of FIG. 2.

A 'bitwise OR function,' as the term is used in this specification, is an inclusive bitwise OR rather than an exclusive bitwise OR. The symbol for the inclusive bitwise OR function in the C and C++ programming languages is '|'. The inclusive bitwise OR function conducts a logical OR function separately on each bit of its operands. The effect is to turn bits on. For these operands, for example, x=00000000 00000001 00000000, in decimal, x=010, and
y=00000000 00000000 00000010, in decimal, y=002, x=x|y yields x=00000000 00000001 00000010, in decimal, x=012. That is, all the bits that were on in each operand are also on in the result of the bitwise OR function.

A broadcast effected by use of a bitwise OR function is a collective operation on an operational group of compute nodes that combines for each element of the contribution data in the send buffer of the logical root, through the bitwise OR function, the element in the contribution data and zeros injected from all ranked nodes other than the logical root in the operational group.

The contribution data, and therefore, the element upon which the allreduce with a bitwise OR function is performed is already stored in the send buffer for the logical root. Many embodiments of the method of FIG. 6 therefore include receiving by the logical root the result of the allreduce and disregarding by the logical root the result of the allreduce. By disregarding the result of the allreduce, the additional overhead of storing the element in a receive buffer for the logical root is avoided without consequence because the same data is currently stored in the send buffer of the logical root.

In some further alternative embodiments, the logical root is intentionally excluded from receiving the result. In such cases, the method of FIG. 6 also includes configuring a class routing algorithm to prevent the reception of the result of the allreduce by the logical root. Such a class routing algorithm is designed to rout transmission of the result of the allreduce so as to avoid the logical root thereby reducing any overhead required by the logical root to store the result in a receive buffer or even to disregard the result.

The method of FIG. 6 is explained further with reference to FIGS. 7A, 7B, and 7C. FIGS. 7A, 7B, and 7C set forth block diagrams of some buffers of the same operational group of compute nodes (102) illustrated at reference (132) on FIG. 6. Read together, FIGS. 7A, 7B, and 7C illustrate a sequence of execution of the method of FIG. 6 with changes in buffer status.

FIG. 7A illustrates the status of the send buffers of the logical root just after configuring the send buffer in step (602) of the method of FIG. 6. The contents of the send buffer in the example of FIG. 7A are '01234560'.

FIG. 7B illustrates the status of the receive buffers of each of the compute nodes (102) of the operational group just after configuring by all the ranked nodes of the operation group the receive buffers in step (608) of the method of FIG. 6. Each receive buffer is large enough to hold the entire results of the broadcast using the allgather operation of the present invention and each buffer is currently empty as shown with dashed lines. In the example of FIG. 7B, a receive buffer is shown for the logical root (203). In many embodiments, to reduce the overhead of the broadcast of the present invention, the logical root does not configure a receive buffer because the logical root already has the contribution data in its send buffer.

FIG. 7C illustrates the status of the receive memory buffers in each compute node (102) of the operational group just after executing the method of FIG. 6 and storing the result of the allreduce with a bitwise OR using the last element of the contribution data of the send buffer of the logical root. The contents of each element of the send buffer have been bitwise ORed with zeros contributed by each of the ranked nodes other than the logical root and the results of each allreduce have been stored in each of the receive buffers of the ranked nodes other than the logical root. The contents of the each of the receive buffers of the ranked nodes other than the logical root include '0123456" which is the same as the contents of the send buffer of the logical root illustrated in FIG. 7A. In the example of FIG. 7C, the logical root (203) disregards each allreduce result and therefore the receive buffer of the logical root is empty as illustrated with dashed lines.

Exemplary embodiments of the present invention are described largely in the context of a fully functional computer system for effecting a broadcast with an allreduce operation on a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web.

Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for effecting a broadcast with an allreduce operation on a parallel computer, the parallel computer comprising a plurality of compute nodes, the compute nodes organized into at least one operational group of compute nodes for collective parallel operations of the parallel computer, each compute node in the operational group assigned a unique rank, the compute nodes of the operational group coupled for data communications through a global combining network; and one compute node assigned to be a logical root, the method comprising:

configuring, by the logical root node, a send buffer having a contribution to be broadcast to each ranked node in the operational group;

configuring, by all ranked nodes other than the logical root, a receive buffer for receiving the contribution from the logical root; and repeatedly for each element of the contribution of the logical root in the send buffer:

contributing, by the logical root, the element of the contribution in the send buffer;

injecting, by all ranked nodes other than the logical root, one or more zeros corresponding to a size of the element;

performing, by all the compute nodes of the operational group, an allreduce operation with a bitwise OR using the element and the injected zeros, yielding a result for the allreduce operation; and storing in each receive buffer, by all ranked nodes other than the logical root, the result of the allreduce.

2. The method of claim 1 wherein injecting one or more zeros corresponding to a size of the element further comprises injecting one or more zeros from dedicated hardware of the compute node.

3. The method of claim 1 wherein performing, by all the compute nodes of the operational group, an allreduce operation with a bitwise OR using the element and the injected zeros further comprises performing the bitwise OR with an arithmetic logic unit ('ALU') on a global combining network adapter for the global combing network.

4. The method of claim 1 further comprising:

receiving by the logical root the result of the allreduce; and disregarding by the logical root the result of the allreduce.

5. The method of claim 1 further comprising configuring a class routing algorithm to prevent reception of the result of the allreduce by the logical root.

6. The method of claim 1 wherein the global combining network comprises a data communications network that includes data communications links connected to the compute nodes so as to organize the compute nodes as a tree.

7. A parallel computer for effecting a broadcast with an allreduce operation on a parallel computer, the parallel computer comprising a plurality of compute nodes, the compute nodes organized into at least one operational group of compute nodes for collective parallel operations of the parallel computer, each compute node in the operational group assigned a unique rank, the compute nodes of the operational group coupled for data communications through a global combining network; and one compute node assigned to be a logical root, the parallel computer comprising a computer processor, a computer memory operatively coupled to the computer processor, the computer memory having disposed within it computer program instructions capable of:

configuring, by the logical root node, a send buffer having a contribution to be broadcast to each ranked node in the operational group;

configuring, by all ranked nodes other than the logical root, a receive buffer for receiving the contribution from the logical root; and repeatedly for each element of the contribution of the logical root in the send buffer:

contributing, by the logical root, the element of the contribution in the send buffer;

injecting, by all ranked nodes other than the logical root, one or more zeros corresponding to a size of the element;

performing, by all the compute nodes of the operational group, an allreduce operation with a bitwise OR using the element and the injected zeros, yielding a result for the allreduce operation; and storing in each receive buffer, by all ranked nodes other than the logical root, the result of the allreduce.

8. The parallel computer of claim 7 wherein computer program instructions capable of: injecting one or more zeros corresponding to a size of the element further comprise computer program instructions capable of: injecting one or more zeros from dedicated hardware of the compute node.

9. The parallel computer of claim 7 wherein computer program instructions capable of: performing, by all the compute nodes of the operational group, an allreduce operation with a bitwise OR using the element and the injected zeros further comprise computer program instructions capable of: performing the bitwise OR with an arithmetic logic unit ('ALU') on a global combining network adapter for the global combing network.

10. The parallel computer of claim 7 wherein the computer memory also has disposed within it computer program instructions capable of:

receiving by the logical root the result of the allreduce; and disregarding by the logical root the result of the allreduce.

11. The parallel computer of claim 7 wherein the computer memory also has disposed within it computer program instructions capable of configuring a class routing algorithm to prevent reception of the result of the allreduce by the logical root.

12. The parallel computer of claim 7 wherein the global combining network comprises a data communications network that includes data communications links connected to the compute nodes so as to organize the compute nodes as a tree.

13. A computer program product for effecting a broadcast with an allreduce operation on a parallel computer, the parallel computer comprising a plurality of compute nodes, the compute nodes organized into at least one operational group of compute nodes for collective parallel operations of the parallel computer, each compute node in the operational group assigned a unique rank, the compute nodes of the operational group coupled for data communications through a global combining network; and one compute node assigned to be a logical root, the computer program product disposed upon a recordable computer readable medium, the computer program product comprising computer program instructions capable of:

configuring, by the logical root node, a send buffer having a contribution to be broadcast to each ranked node in the operational group;

configuring, by all ranked nodes other than the logical root, a receive buffer for receiving the contribution from the logical root; and repeatedly for each element of the contribution of the logical root in the send buffer:

contributing, by the logical root, the element of the contribution in the send buffer;

injecting, by all ranked nodes other than the logical root, one or more zeros corresponding to a size of the element;

performing, by all the compute nodes of the operational group, an allreduce operation with a bitwise OR using the element and the injected zeros, yielding a result for the allreduce operation; and storing in each receive buffer, by all ranked nodes other than the logical root, the result of the allreduce.

14. The computer program product of claim 13 wherein computer program instructions capable of: injecting one or more zeros corresponding to a size of the element further comprise computer program instructions capable of: injecting one or more zeros from dedicated hardware of the compute node.

15. The computer program product of claim 13 wherein computer program instructions capable of: performing, by all the compute nodes of the operational group, an allreduce operation with a bitwise OR using the element and the injected zeros further comprise computer program instructions capable of: performing the bitwise OR with an arithmetic logic unit ('ALU') on a global combining network adapter for the global combing network.

16. The computer program product of claim 13 wherein the recordable computer readable medium also has disposed within it computer program instructions capable of:
receiving by the logical root the result of the allreduce; and
disregarding by the logical root the result of the allreduce.

17. The computer program product of claim 13 wherein the recordable computer readable medium also has disposed within it computer program instructions capable of configuring a class routing algorithm to prevent reception of the result of the allreduce by the logical root.

18. The computer program product of claim 13 wherein the global combining network comprises a data communications network that includes data communications links connected to the compute nodes so as to organize the compute nodes as a tree.

* * * * *